United States Patent Office 3,056,811
Patented Oct. 2, 1962

3,056,811
PREPARATION OF ESTRADIOL AND INTERMEDIATES THEREOF
Gerard Nomine, Noisy-le-Sec, Daniel Bertin, Montrouge, and Michel Vignau, Neuilly (Seine), France, assignors, by mesne assignments, to Roussel-UCLAF, S.A., Paris, France, a corporation of France
No Drawing. Filed Sept. 20, 1960, Ser. No. 57,136
Claims priority, application France Nov. 3, 1959
4 Claims. (Cl. 260—397.5)

The present invention relates to a novel process for the preparation of estradiol, one of the well known sex hormones. The invention further relates to novel intermediates thereof, namely, 17β-acyloxy-19-nor-Δ$^{4,9(10)}$-androstadiene-3-one compounds of the formula:

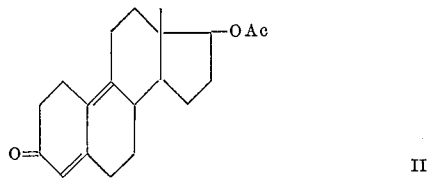

wherein Ac is the acyl radical of a hydrocarbon carboxylic acid of 1 to 18 carbon atoms.

An object of the invention is a novel process for the production of estradiol from octahydronaphthalenic compounds.

Another object of the invention is the novel intermediates for the preparation of estradiol, namely, 17β-acyloxy-19-nor-Δ$^{4,9(10)}$-androstadiene-3-ones.

These and other objects and advantages of this invention will become more obvious from the following detailed description.

The process of the present invention comprises forming 17β-acyloxy-19-nor-Δ$^{4,9(10)}$-androstadiene-3-ones by cyclizing octahydronaphthalenes of the formula

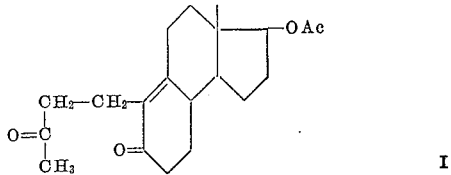

wherein Ac has the values recited above, to form 17β-acyloxy-19-nor-Δ$^{4,9(10)}$-androstadiene-3-ones. The latter compounds are isomerized into the corresponding esters of estradiol which are saponified to obtain estradiol in the free form. The following table shows the reaction scheme:

TABLE I

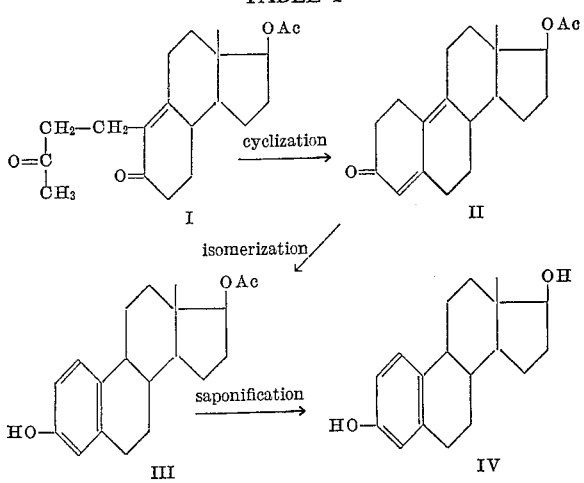

The cyclization of the octahydronaphthalenic compounds of Formula II is advantageously carried out in the presence of an alkaline cyclization agent such as alkali metal or alkaline earth metal alkanols. A preferred cyclization agent is sodium tertiary amylate. Other alkanols, such as methanol, ethanol, butanol, and tertiary butanol may be used.

The isomerization of the 17β-acyloxy-19-nor-Δ$^{4,9(10)}$-androstadiene-3-ones is effected by heating the said compounds in the presence of a hydrogenation catalyst such as palladized carbon black. The isomerization is preferably conducted at elevated temperatures, and especially at about 180° C. The use of an inert organic solvent, stable at these temperatures, is advantageous. Pressure may be employed.

The saponification of the estradiol esters can be carried out in any alkaline medium. The alkaline medium may be aqueous solutions of alkali metal or alkaline earth metal hydroxides, for example.

The acyl radical of the compounds of the invention is the acyl radical of a hydrocarbon carboxylic acid of 1 to 18 carbon atoms. The carboxylic acid may be an aliphatic acid such as acetic, propionic, butyric, and caproic acids; an aryl acid such as benzoic acid, toluic acid, naphthoic acid; or an aralipatic acid such as phenyl acetic acid; or a cycloaliphatic acid such as cyclopentanoic acid and cyclohexanoic acid.

In the following examples there are described several preferred embodiments to illustrate the invention. However, it should be understood that the invention is not intended to be limited to the specific examples. The melting points are instantaneous melting points determined on the Maquenne block.

*Example 1*

PREPARATION OF 17β-BENZOXY-19-NOR Δ$^{4,9(10)}$-ANDROSTADIENE-3-ONE (I—Ac=C$_6$H$_5$CO)

1.25 cc. of a toluene solution containing 1.52 N sodium tertiary amylate was introduced into a solution of 0.715 gram of Δ$^{8,9}$-3-methyl-7-oxo-8-(3'-oxobutyl)-3,4-[3'-benzoxy-cyclopentano-(2',1')]-octahydronaphthalene (II, Ac=C$_6$H$_5$CO), having a melting point of 116.5°–118° C. and a specific rotation of [α]$_D^{20}$=+43° (methanol) in 10 cc. of toluene. Compound II was obtained by condensation of Δ$^{9,10}$-3-methyl-7-oxo-3,4-[3'-benzoxy-cyclopentano-(2',1')]-octahydronaphthalene with 1,3-dichloro 2-butene in the presence of sodium tertiary amylate and hydrolysis of the Δ$^{9,10}$-3-methyl-7-oxo-8-(3'-chloro-2'-butenyl)-3,4-[3'-benzoxy-cyclopentano-(2',1')]-octahydronaphthalene with sulfuric acid according to the process described in copending commonly assigned United States patent application Serial No. 36,171, filed June 15, 1960, now U.S. Patent No. 3,019,252.

The reaction mixture was heated to 95° C. in a nitrogen atmosphere for several minutes. The mixture was then cooled, neutralized with acetic acid and concentrated to a small volume. The concentrated mixture was then poured into water and extracted with methylene chloride. The extracts were combined and dried over sodium sulfate. The dried extracts were filtered and evaporated to dryness to furnish a residue of 0.70 gram which was recrystallized from ether. The product was purified by chromatography on silica gel and eluted with methylene chloride containing 1.5% of acetone. 0.557 gram of 17β-benzoxy 19-nor Δ$^{4,9(10)}$-androstadiene-3-one (I, Ac=C$_6$H$_5$CO) were recovered having a melting point of 155° and 164° and a specific rotation [α]$_D^{20}$=−73.5° (c=0.4% in methanol).

The product was in the form of white crystals and was very soluble in ethyl alcohol, acetone, benzene and chloroform, slightly soluble in ether, and insoluble in water and dilute aqueous acids or alkalis.

By cyclizing the racemic form of compound II, $Ac=C_6H_5CO$, according to the method of operation given above, the racemate of compound I, $Ac=C_6H_5CO$, was obtained with a yield of 69%, having a melting point of 186°. Product I, $Ac=C_6H_5CO$, is not described in the literature. The ultraviolet spectra showed $\lambda$ max. 230 m$\mu$, $\epsilon=18,900$; $\lambda$ max. 303 m$\mu$, $\epsilon=20,700$.

*Example 2*

PREPARATION OF ESTRADIOL BENZOATE STARTING FROM COMPOUND I, $Ac=C_6H_5CO$ 10.2 mg. of compound I, $Ac=C_6H_5CO$, 10 mg. of palladized carbon black containing 10% palladium and 0.4 cc. of p-cymene previously treated at the boiling point with palladized carbon black were introduced into a 1 cc. ampule, and the ampule was sealed under vacuum. The ampule was then heated to 172° to 180° with agitation for 2 hours. The ampule was broken and the contents were then added to ethanol and filtered. The palladized carbon black was washed with ethanol and the ethanolic solutions were combined and evaporated to dryness under vacuum. The residue, 8.6 mg. was purified by chromatography on paper and the estradiol benzoate was characterized by its infra-red spectra and its usual color reactions.

Various modifications of the process and the products of the present invention may be made without departing from the spirit or scope thereof, and it is to be understood that the invention is limited only as defined in the appended claims.

We claim:
1. A process for the preparation of estradiol which comprises cyclizing in the presence of an alkaline cyclization agent octahydronaphthalenes of the formula:

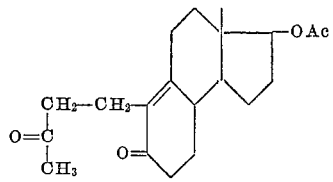

wherein Ac is the acyl radical of a hydrocarbon carboxylic acid of 1 to 10 carbon atoms to form 17$\beta$-acyloxy-19-nor-$\Delta^{4,9(10)}$-androstadiene-3-ones of the formula

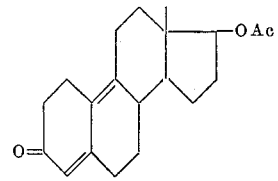

wherein Ac has above designation, isomerizing by heating said compounds into the corresponding estradiol monoesters and saponifying the esters to form estradiol.

2. The process of claim 1 wherein the cyclization is effected in the presence of sodium tertiary amylate.

3. The process of claim 1 wherein the isomerization is carried out by heating the 17$\beta$-acyloxy-19-nor-$\Delta^{4,9(10)}$-androstadiene-3-ones in the presence of palladized carbon black.

4. A process for the preparation of estradiol which comprises cyclizing $\Delta^{8,9}$-3-methyl-7-oxo-8-(3'-oxo-butyl)-3,4-[3'-benzoxy cyclopentano (2',1')] octahydronaphthalene in the presence of sodium tertiary amylate to form 17-benzoxy-19-nor-$\Delta^{4,9(10)}$-androstadiene-3-one, isomerizing the latter to estradiol benzoate by heating in the presence of palladized carbon black and saponifying said esters to form estradiol.

No references cited.